April 11, 1961     J. STUART III     2,979,286
HORIZONTAL TAIL PLANE FOR HELICOPTERS
Filed Aug. 31, 1959

INVENTOR.
Joseph Stuart III
BY
Fryer + Johnson
ATTORNEYS

United States Patent Office 2,979,286
Patented Apr. 11, 1961

2,979,286

HORIZONTAL TAIL PLANE FOR HELICOPTERS

Joseph Stuart III, Palo Alto, Calif., assignor, by mesne assignments, to Hiller Aircraft Corp., Palo Alto, Calif., a corporation of California Filed Aug. 31, 1959, Ser. No. 836,962

4 Claims. (Cl. 244—17.19)

This invention relates to a horizontal tail plane for a helicopter and, more particularly, to a tail plane designed to improve the stability of a helicopter in level flight and to impart no appreciable deflection from trim during climbing or gliding flight for altitude change.

A horizontal tail plane is advantageous in its improvement of the longitudinal stability of helicopters in forward flight. However, in a helicopter, large stationary tail planes are not satisfactory in gliding and climbing flights because altitude changes are generally made along flight paths which are not parallel to the longitudinal axis of the fuselage. Therefore, the relative wind will impinge upon a fixed stabilizer tail plane at varying angles depending upon the direction and rate of altitude change. With the remote relative wind directed at an angle to a fixed stabilizing tail, particularly one of sizable area, the tail of the craft would be forced downward by the relative wind when climbing and upward by the relative wind when descending. The resultant tilting of the fuselage relative to the rotor blade tip path reduces the amount of rotor tilt available for attitude control. Moreover, when the tail is forced upwardly, a particularly critical situation could occur if the tail boom is forced toward the path of the main rotor blade.

It is, therefore, an object of this invention to provide a horizontal tail plane for helicopters which is in operation with substantially equal efficacy in both horizontal and climbing or gliding flight.

It is a further object of this invention to provide a horizontal tail plane for helicopters which is adjustable to operation in varying flight conditions.

It is a further object of this invention to provide a horizontal tail plane for helicopters which may be adjusted to meet variations in relative wind direction encountered during altitude changes.

It is a further object of the invention to provide a horizontal tail plane that is simple and reliable in operation.

A principal feature of this invention is the provision of a laterally extending horizontal tail surface designed to minimize and dampen pitching of the aircraft. The horizontal tail plane is pivotally mounted so that the disposition of its leading edge relative to the longitudinal axis of the fuselage can be varied, i.e. it may be tilted upwardly to meet the downwardly directed relative wind when climbing and downwardly to meet the upwardly directed relative wind when gliding. The variable settings of the horizontal tail plane are accomplished by linking it directly to the pilot operated control lever for varying the collective pitch of the rotor blades by means of which altitude changes are accomplished. Thus, any movement of the control lever designed to vary the pitch angle of the rotor blades will, at the same time, effect a concomitant change in the setting of the horizontal tail plane.

Other objects and advantages of this invention will become apparent from the description following when read in connection with the accompanying drawings wherein.

Figure 1:
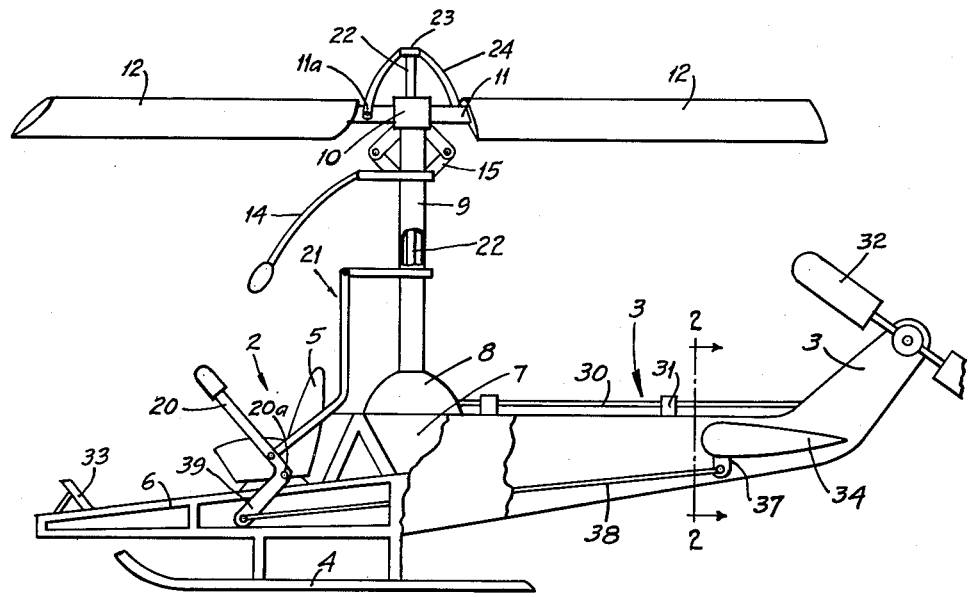
Fig. 1 is a schematic view of a helicopter embodying features of my invention.

Referring now to the drawings with more particularity, there is shown a more or less conventional helicopter including a fuselage 2 including a rearwardly extending tail boom 3. The body and tail boom may be of any suitable construction and could include skids 4 or any suitable landing gear to support the helicopter on the ground. A pilot compartment of any suitable accommodations may be provided, although for purposes of illustration there is shown merely a seat 5 secured to the framework 6 of the body 2. Mounted rearwardly of the cockpit 5 is a suitable source of power 7 such as an internal combustion engine adapted to rotate, through reduction gearing 8, a main drive shaft or mast 9 at the top of which is carried a hub 10. Journalled in the hub 10 at diametrically opposite sides thereof are radially extending support shafts 11, each carrying a rotor blade 12.

Conventionally the hub 10 is secured to the main drive shaft 9 by a gimbal mounting which permits pivotal movement of the blades 12 and the hub 10, all as a unit about a transverse axis of the gimbal ring to effect flapping. Flapping for attitude control is imposed by manipulation of a cyclic pitch control lever 14 to cyclically vary the pitch of the rotor blades differentially in the conventional manner by means of the usual swash plate and suitable interconnecting links 15.

A second control lever 20 is pivotally mounted on the frame 6 at 20a and is connected by suitable linkage 21 to a central rod 22 within the driving shaft 9. A crown 23 at the top of the rod 22 is connected by means of links 24 to suitable pins or the like 11a on the rotor support shafts 11. Thus, vertical movement of the rod 22 rotates the rotor support shafts 11 equally and simultaneously in opposite directions to change the pitch of the blades equally and collectively. While the specific collective pitch control structure is not shown in detail, the vertical movement of the rod 22 is produced by pivotal movement of the control lever 20.

Also driven from the gear box 8 is a shaft 30 rotatably carried in bearings 31 on the tail boom 3 to drive the conventional tail rotor 32 for controlling yaw or fuselage heading, and for opposing torque required to produce rotation of the rotor blades 12. The pitch of the tail rotor is controlled in conventional fashion by suitable foot pedals 33.

At least one horizontal tail plane 34 and preferably a pair thereof, are extended laterally from the tail boom 3 for minimizing, through aerodynamic forces acting thereon, undesirable pitching of the aircraft. The tail planes 34 are mounted to pivot on the tail boom 3 by any suitable means, as, for example, pivot pins or a shaft 35 to which the tail planes 34 are splined, rotatably carried in bearings 36 fixed to the tail boom 3. A depending arm 37 is fixed to the shaft 35 and pivotally connected to one end of a motion transmitting link 38. The other end of the link is pivotally connected to an arm 39 secured to and pivoted with collective pitch control lever 20.

Figure 3:
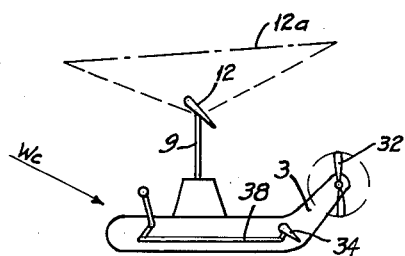
Figs. 3, 4 and 5 are schematic diagrams of a helicopter showing various phases of operation of the horizontal tail plane control mechanism forming a part of my invention.

In operation of the horizontal tail plane, when the lever 20 is pulled rearward about pivot 20a to increase the pitch of all rotor blades collectively for increase in altitude, as shown in Fig. 3, the movement of the bell crank arm 39 forward will pivot the leading edge of the tail plane 34 upwardly relative to the longitudinal axis of the fuselage 2. In this way, the horizontal tail plane will be turned toward the relative wind WC to maintain the tail boom in comparatively fixed position relative to the rotor blades 12. Thus, the pivotal movement of the gimbal 10, affording a control of the plane of rotation 12a of the lift rotor 12 relative to the fuselage 2 will not be absorbed by the pitching of the tail 3 but will be available for further control.

Figure 4:
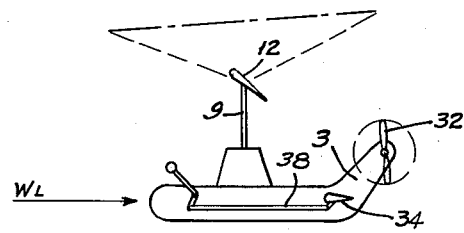
Figure 2:
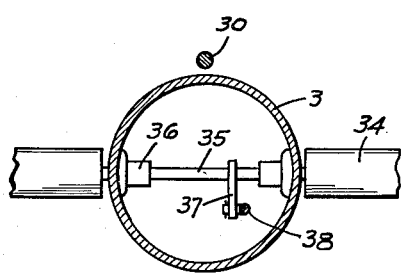
Fig. 2 is a section view taken along line 2—2 of Fig. 1.

In Figs. 1 and 4, the conditions of level flight are shown with the control lever pushed down approximately one-half of its operating range. The relationship of the tail assemblies and control lever is such that at this stage the rear stabilizer will be at an intermediate setting with its chord line substantially parallel to the fuselage axis for stabilizing the helicopter in level flight.

Figure 5:
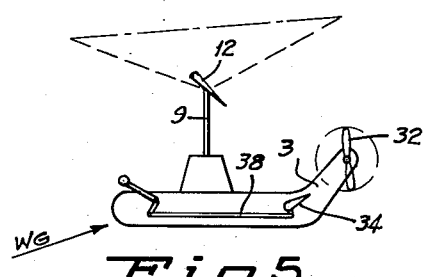

In Fig. 5, the glide or autorotational condition is illustrated with the collective pitch control lever pushed down its full extent. There, the interconnecting link 38 drives the horizontal tail plane arm 37 rearwardly to tilt the leading edge of the tail plane downward and move the chord of the tail plane toward alignment with the upwardly directed relative wind WG. Thus, there are no appreciable aerodynamic forces tending to drive the tail boom 3 into the path 12a of the rotor blades.

It is to be understood that the precise geometry of the system is a matter of engineering design influenced by various factors, including design speeds. Obviously, with any given amount of lift variation, the flight path and, hence the direction of the relative wind, will depend upon the forward speed of the helicopter. Also, such a tail plane may be influenced by the rotor downwash impinging thereon and the angular disposition of the tail plane adjusted accordingly.

While I have shown a preferred form of this invention, it is apparent that modifications and changes therein can be made without departing from the spirit and scope of this invention which is intended to be defined by the claims appended hereto.

What is claimed as my invention is:

1. A rotary wing aircraft comprising a fuselage having a pilot's station thereon, a main lift rotor above said fuselage and rotatable thereover, said rotor comprising a hub and a plurality of rotor blades each of which is pivotable about its own axis relative to said hub whereby the pitch of each of said blades may be varied, a pilot operable control member movably positioned adjacent said pilot's station, means operatively interconnecting said control member with each of said rotor blades whereby simultaneous pivotal movement of said blades in the same direction about their respective axes may be effected by movement of said control member whereby blade pitch may be collectively and selectively modified, a tail plane stabilizer pivotally mounted on said fuselage for enhancing flight stability of said aircraft, said stabilizer extending transversely of said fuselage and being pivotable about an axis which is angularly related to the longitudinal axis of said fuselage, and means operatively connecting said stabilizer directly to said collective pitch control member so that movement of said member in a predetermined direction effects corresponding pivotal movement of said stabilizer in a predetermined direction in conjunction with modification of the collective pitch of said rotor blades.

2. A rotary wing aircraft comprising a fuselage having a pilot's station thereon, a main lift rotor above said fuselage and rotatable about a generally upright axis thereover, said rotor comprising a hub and a plurality of rotor blades projecting laterally from said hub each of which is pivotable about its own axis relative to said hub whereby the pitch of each of said blades may be varied for changing altitude of said aircraft during flight, a pilot operable control member movably positioned adjacent said pilot's station, means operatively interconnecting said control member with each of said rotor blades whereby simultaneous pivotal movement of said blades about their respective axes in unison and in the same direction may be effected by selective movement of said control member so that said blades may be simultaneously and selectively pivoted to decrease or increase their pitch in accordance with the direction of movement of said member, a tail plane stabilizer pivotally mounted on said fuselage for enhancing flight stability of said aircraft during horizontal, climbing or descending flight, said stabilizer extending transversely of said fuselage and being rotatable about an axis which is angularly related to the longitudinal axis of said fuselage, and means operatively and directly connecting said stabilizer to said collective pitch control member so that movement of said member in a predetermined direction effects simultaneous pivotal movement of said stabilizer in a predetermined direction, whereby an increase in the collective pitch of said rotor blades is accompanied by pivotal movement of the leading edge of said stabilizer upwardly, and vice versa.

3. A rotary wing aircraft comprising a fuselage having a pilot's station thereon, a main lift rotor above said fuselage and rotatable about a generally upright axis thereover, said rotor comprising a hub and a plurality of rotor blades projecting laterally from said hub each of which is pivotable in opposite directions about its own axis relative to said hub whereby the pitch of said blades may be varied for changing altitude of said aircraft during flight, a pilot operable control lever movably positioned adjacent said pilot's station, means operatively interconnecting said control lever with each of said rotor blades whereby simultaneous pivotal movement of said blades about their respective axes in unison and in a predetermined direction may be effected by selective movement of said control lever in a predetermined direction so that said blades may be simultaneously, selectively, and collectively pivoted to decrease or increase the pitch thereof in accordance with the direction of movement of said lever, a pair of tail plane stabilizers pivotally mounted on said fuselage for enhancing flight stability of said aircraft during horizontal, climbing or descending flight, said stabilizers extending transversely of said fuselage and each being rotatable about an axis which extends generally normal to the longitudinal axis of said fuselage, and means operatively and directly connecting each of said stabilizers to said collective pitch control lever so that movement of said lever in a predetermined direction effects simultaneous rotation of said stabilizers in a predetermined direction, whereby an increase in the collective pitch of said rotor blades is accompanied by pivotal movement of the leading edges of said stabilizers upwardly in unison, and vice versa.

4. A rotary wing aircraft comprising a fuselage having a pilot's station thereon, a main lift rotor above said fuselage and rotatable about a generally upright axis thereover, said rotor comprising a hub and a plurality of rotor blades projecting laterally from said hub each of which is pivotable in opposite directions about its own axis relative to said hub whereby the pitch of each said blades may be varied for changing altitude of said aircraft during flight, a pilot operable control lever movably positioned adjacent said pilot's station, means operatively interconnecting said control lever with each of said rotor blades whereby simultaneous pivotal movement of said blades about their respective axes in unison and in a predetermined direction may be effected by selective movement of said control lever in a predetermined direction so that said blades may be simultaneously and selectively pivoted to decrease or increase the pitch thereof in accordance with the direction of movement of said lever, a pair of tail plane stabilizers pivotally mounted on said fuselage for enhancing flight stability of said aircraft during horizontal, climbing or descending flight, said stabilizers extending transversely of said fuselage on opposite sides thereof and each being rotatable in unison with the other about an axis which extends generally transversely of said fuselage, and means operatively and directly connecting each of said stabilizers to said collective pitch control lever so that movement of said lever in a predetermined direction effects simultaneous rotation of said stabilizers in a predetermined direction whereby an increase in the collective pitch of said rotor blades is accompanied by pivotal movement of the leading edges of said stabilizers upwardly, and vice versa; said means connecting said stabilizers to said control lever comprising a link secured at one of its ends to said control lever so that movement of said control lever in a predetermined direction effects movement of said link in a predetermined direction, a pivot shaft extending transversely of said link adjacent its other end, said stabilizers being mounted on said shaft for rotation therewith, and a connecting arm secured to said shaft and said other link end, whereby movement of said link in a predetermined direction effects pivotal movement of said shaft in a predetermined direction with said stabilizers thereon.

References Cited in the file of this patent

UNITED STATES PATENTS

| | | |
|---|---|---|
| 2,420,823 | Hays | May 20, 1947 |
| 2,551,067 | Stanley | May 1, 1951 |

FOREIGN PATENTS

| | | |
|---|---|---|
| 203,012 | Switzerland | Feb. 15, 1939 |

Notice of Adverse Decision in Interference

In Interference No. 92,525 involving Patent No. 2,979,286, J. Stuart, III, Horizontal tail plane for helicopters, final judgment adverse to the patentee was rendered July 31, 1962, as to claims 1, 2 and 3.
[*Official Gazette September 18, 1962.*]